(12) United States Patent
Boutahar et al.

(10) Patent No.: US 8,341,088 B2
(45) Date of Patent: Dec. 25, 2012

(54) MULTIPURPOSE ELECTRONIC PAYMENT METHOD AND SYSTEM

(75) Inventors: Mohammed Boutahar, Caen (FR); Aymeric De Solages, Caen (FR); Jean-Claude Pailles, Epron (FR)

(73) Assignee: France Telecom, Paris (FR)

( * ) Notice: Subject to any disclaimer, the term of this patent is extended or adjusted under 35 U.S.C. 154(b) by 827 days.

(21) Appl. No.: 11/631,172

(22) PCT Filed: Jun. 30, 2004

(86) PCT No.: PCT/FR2004/001690
§ 371 (c)(1),
(2), (4) Date: Dec. 29, 2006

(87) PCT Pub. No.: WO2006/010800
PCT Pub. Date: Feb. 2, 2006

(65) Prior Publication Data
US 2008/0294563 A1    Nov. 27, 2008

(51) Int. Cl.
G06Q 20/00     (2012.01)
H04L 9/32      (2006.01)
(52) U.S. Cl. ............... 705/76; 705/39; 705/41; 705/52
(58) Field of Classification Search ............... 705/50–52, 705/39, 41, 76
See application file for complete search history.

(56) References Cited

U.S. PATENT DOCUMENTS

| | | | | |
|---|---|---|---|---|
| 5,892,900 | A * | 4/1999 | Ginter et al. | 726/26 |
| 6,250,557 | B1 | 6/2001 | Forslund et al. | |
| 6,272,492 | B1 * | 8/2001 | Kay | 1/1 |
| 7,357,309 | B2 * | 4/2008 | Ghosh et al. | 235/380 |
| 7,463,133 | B2 * | 12/2008 | Bonalle et al. | 340/5.61 |
| 7,542,942 | B2 * | 6/2009 | Peart et al. | 705/39 |
| 2001/0037291 | A1 | 11/2001 | Allen | |
| 2002/0188575 | A1 * | 12/2002 | Freeny, Jr. | 705/72 |
| 2002/0198849 | A1 * | 12/2002 | Piikivi | 705/76 |
| 2003/0191945 | A1 | 10/2003 | Keech | |
| 2004/0068472 | A1 * | 4/2004 | Sahota et al. | 705/64 |
| 2005/0119978 | A1 * | 6/2005 | Ates | 705/67 |

FOREIGN PATENT DOCUMENTS

| | | | |
|---|---|---|---|
| WO | WO03044710 | * | 5/2003 |
| ZA | 20015872 | * | 7/2001 |

OTHER PUBLICATIONS

3GPP TS 11.14 V8.13.0 (Mar. 2003) Technical Specification 3rd Generation Partnership Project; Specification of the SIM Application Toolkit for the Subscriber Identity Module—Mobile Equipment (SIM—ME) interface (Release 1999), 138 pages.*

McKitterick et al., "State of the Art Review of Mobile Payment Technology", Department of Computer Science, Trinity College Dublin, 2003, 22 pages.*

"Mobey Forum White Paper on Mobile Financial Services", Mobey Forum Mobile Financial Services Ltd., Jun. 2003, 24 pages.*

* cited by examiner

Primary Examiner — James D Nigh
(74) Attorney, Agent, or Firm — Young & Thompson

(57) ABSTRACT

The invention relates to multipurpose electronic payment method and system. The inventive method consists in transmitting (A) from a multimedia terminal (TM) a payment order (MP) issued from at least one multimedia application hosted in the (TM) to a local proxy for payment (PP), in discriminating (B) said payment order in (PP) upon a specific local processing criterion respectively remote, in carrying out (C) a local payment upon the retained local payment specific criterion, if not in transmitting (D) the payment order to a remote system (SD) for carrying out a remote payment. Said invention is usable for proximity payment transitions, external payment or for electronically carrying out a telepayment.

12 Claims, 4 Drawing Sheets

MULTIPURPOSE ELECTRONIC PAYMENT METHOD AND SYSTEM

The electronic payment systems giving access to a service by means of a mobile telephony terminal for proximity commerce or online commerce, for which one or more connections to at least one remote system SD, controlling the financial resources of the user who owns this mobile telephony terminal, are indispensable at the present time for the promotion of electronic commerce.

The object of these connections is either to obtain the approval of the remote system SD, for the execution of the payment transaction, or to inform the remote system SD of the expenditure of this customer, in order to invoice it.

Remote systems which control the financial resources of customers, are generally contacted by the service provider or trader. Taking the order and gaining possession of the goods or use of the service purchased is done either on the mobile terminal of the user, or by means of another terminal, a dedicated terminal for example.

At present, mobile telephony systems are widely used to surf the Internet, using either the classic protocol or WAP, in order to obtain information, some of which, because of its value, may be obtained for a consideration.

Among the payment methods that can be envisaged are telepayment, proximity payment or internal payment. In all cases, the user of the mobile telephony terminal has a payment means on which his expenditure is recorded.

In the case of telepayment, this payment means is controlled in the network and this type of transaction therefore requires that the mobile telephony terminal be in the radio service area, to be connected to the network, such as the GSM network. An example of this situation relates to transactions paid by means of a bank card, in which the mobile telephony terminal allows the same type of bank transactions to be initiated as those made from a personal computer connected to the Internet.

In the case of proximity payment, because of their deployment, the speed with which users change them, their security characteristics and qualities, the fact that they are connected to the network when they are used in the radio service area, and have dialogue interfaces available, such as a keyboard and display device, mobile telephony terminals or multimedia terminals provided with communication functions can become a proximity payment means to make purchases on payment terminals or cash dispensers. Such embodiments are offered by way of demonstration in Europe, Japan and Korea.

In the case of internal payment, the safer environment of transactions made from a mobile telephony terminal is put to good use.

For example, games on mobile telephony terminals are at present becoming more and more widespread. Games producers are, consequently, interested in sales formulas that are pay-as-you-go, per session or whenever a new game level is accessible. This concept corresponds substantially to that known in television under the name "pay per view". This type of access to services or products is not developed in the field of terminals or PCs connected to the Internet, on account of the security problems that make such transactions hazardous for producers and service suppliers.

The different types of payment context referred to above are, at present, processed in implementations that are practically independent, and, in all cases, too partial.

The object of the present invention on the other hand is the implementation of a substantially multipurpose electronic payment method and system, substantially regardless of the payment method, whether telepayment, proximity payment or finally retained internal payment.

Another object of the present invention is, for example, in the case of the implementation of a telepayment, in particular for a very small amount, the execution of such a telepayment in the absence of message transmission by an air interface (OTA messages), by means of the GSM radiotelephony network for example, between the mobile telephony terminal and a payment server, which allows this type of transaction to be processed more quickly and economically.

Finally, another object of the invention is the implementation of an electronic payment method and system provided with powerful or sufficiently robust security mechanisms for a proximity payment process not to be able to harm the beneficiary of the payment, in particular, because the recording of such a transaction is permanent, the subsequent remittance to the organisation controlling the funds of the user is assured and no misappropriation or embezzlement can be envisaged.

The electronic payment method between a multimedia terminal and a remote payment management system according to the present invention, is remarkable in that it consists in transmitting a payment order issued by at least an application hosted by a multimedia terminal, from this multimedia terminal to a proxy local to this multimedia terminal, in discriminating this payment order in this local payment proxy on a specific local or remote processing criterion of this multimedia terminal, in carrying out a payment according to a local payment method of this payment order in said payment proxy on the specific local processing criterion retained for this payment order, or else in transmitting at least this payment order to this remote system to make a payment according to a remote payment method.

The electronic payment system between a multimedia terminal and a remote payment management system, this remote system comprising at least a payment server and this multimedia terminal comprising at least a mobile radiotelephony communication interface according to the present invention, is remarkable in that this multimedia terminal comprises at least a payment proxy, this multimedia payment proxy being disconnection-mounted between this application and this communication interface, so as to intercept any payment order issued by this application, this payment proxy comprising at least a module for discriminating this payment order on a specific local or remote processing criterion of this payment order, a module for the local processing of this payment order, on the specific local processing criterion retained for this payment order and a module for transmitting this payment order to this payment server, to make a payment according to a remote payment method, or else, by means of this communication interface.

The electronic payment method and system according to the present invention can be applied to the execution of payment transactions in the most diverse situations, in particular electronic, online or proximity payment.

They will be better understood from the description and the accompanying drawings below in which:

FIG. 2b represents, purely by way of illustration, a detail of the implementation of the steps B for discriminating a payment order, C for executing local processing and D for executing transmission for remote processing illustrated in FIG. 2a;

Prior to the actual description of the electronic payment method and system according to the present invention, various items of information relating to the interactions, in other words message exchanges between the various entities implemented by the electronic payment method and system according to the present invention, will be given in connection with FIG. 1.

In general, with reference to the aforementioned figure, an interaction marked by a two-direction arrow, ITS, corresponds to the sending of one or more messages between two entities B and C.

It is oriented from B to C by an arrow, $ITS_1$, when B is the originator of this interaction and when C is the target thereof or reciprocally by $ITS_2$.

These orientations may be indicated as illustrated for the $ITS_1$ and $ITS_2$ interactions.

Simplified representations are illustrated for the $IT_1$ and $IT_2$ transactions. The last-mentioned representations may be used for sending a message by B to C in $IT_1$ or in $IT_2$ for the reception of a message by B of a message issued by C.

An interaction is said to be composed to describe an exchange between two entities comprising a succession of single interactions. It may be marked, as represented in ITS, $ITS_1$ or $ITS_2$, as illustrated in FIG. 1, or it may be itemised as a succession of single interactions.

Figure 1:
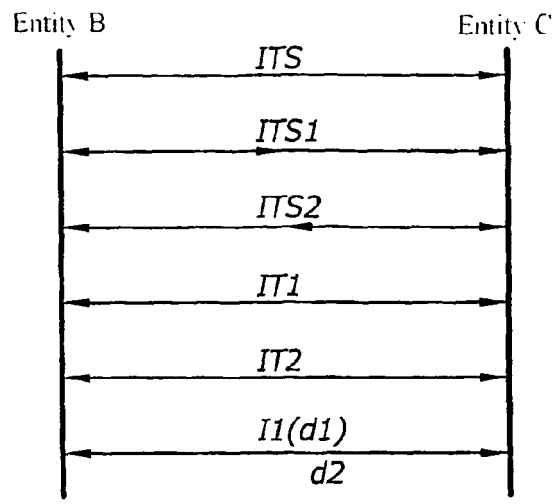
FIG. 1 represents, by way of illustration, a diagram representing symbolically transactions implemented by the electronic payment method and system according to the present invention.

Data exchanged in the course of an interaction, interaction $I_1$ ($d_1$) illustrated in FIG. 1, are indicated above and below an interaction arrow, the datum marked $d_1$ above the double arrow of the interaction indicating all or part of a message sent by the entity originating the interaction, a datum marked $d_2$ in the case of FIG. 1 and of interaction $I_1$ indicating all or part of the message sent by the entity C which is the target of interaction $I_1$ in response to the message sent.

Two interactions are said to be nested if these interactions are not sequential, in other words if one of them begins before the end of the other.

An interaction J is a sub-interaction of I, or J is contained in I, if the single interactions composing interaction J also form part of the succession of single interactions that define I.

A more detailed description of the electronic payment method between a multimedia terminal and a remote payment management system according to the present invention will now be given in connection with FIG. 2a.

In general, it will be recalled that the electronic payment method according to the present invention is implemented between a multimedia terminal, marked TM, and a remote payment management system, marked SD.

It will be recalled that a multimedia terminal TM is defined as any terminal provided with a mobile telephony function.

The multimedia terminal TM is said to implement one or more multimedia applications, marked AMM, for example.

It will further be recalled that a multimedia application is a paid-for application, because some of the actions possible by means of this application implemented by means of the multimedia terminal TM are subject to a payment controlled by the remote system SD comprising one or more payment servers.

As a non-limiting example, it is indicated that the application AMM may be an application that has been downloaded and paid for or not beforehand, a particular important case being that of applications written in the Java language.

An AMM application may also consist of the client portion, on the multimedia terminal TM, of a client/server-type multimedia application AMMC. This AMM client portion contains the AMMC presentation layer and can use the Internet browser of the multimedia terminal TM. The multimedia application AMM is then in interaction with an application layer $AMM_2$ of the AMMC hosted on a server remote from this application. In the case of an AMMC client/server application, the AMM client portion is referred to henceforward simply as the "AMMC presentation layer".

Figure 2A:
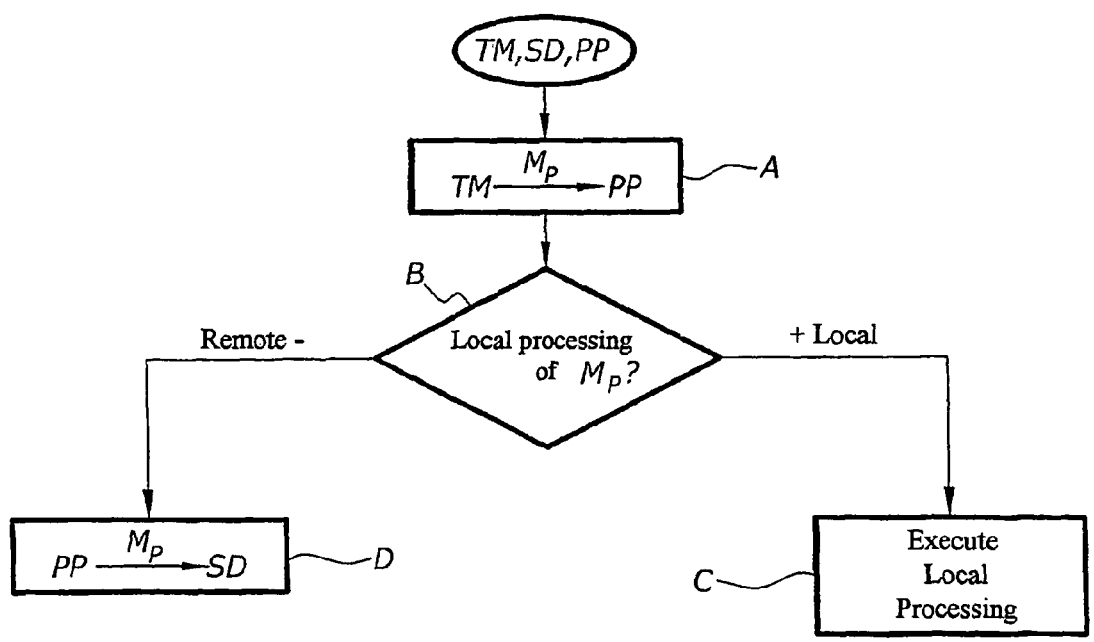
FIG. 2a represents, by way of illustration, a flow diagram of the essential implementation steps of the method according to the present invention.

With reference to FIG. 2a, the method according to the invention consists in transmitting in step A a payment order issued by at least a multimedia application AMM hosted by the terminal TM, from the terminal TM to a payment proxy local to this multimedia terminal, which proxy is marked PP.

The aforementioned operation is represented symbolically by the relation:

$$TM \xrightarrow{Mp} PP.$$

In the above relation, $M_P$ indicates the payment order or payment message in accordance with the convention defined above in the introduction to the description.

Step A is followed by step B consisting in discriminating the payment order, in the local payment proxy PP, on a specific local or remote processing criterion of this payment order.

In FIG. 2a, step B is represented as a test step aimed at determining the local or remote character of the processing carried out on the payment order $M_P$ according to the symbolic relation Local Processing of $M_P$?

Step B above is then followed by step C consisting in carrying out a payment according to a local payment method of this payment order in the payment proxy PP on the specific local processing criterion retained for this payment order.

If not, step B is followed by step D consisting of transmitting at least the payment order to the remote system to make a payment according to a remote payment method.

In FIG. 2a, the operation carried out in step D is represented by the symbolic relation according to the transaction:

$$-PP \xrightarrow{Mp} SD$$

In connection with FIG. 2a, it is indicated that according to a particularly advantageous aspect of the method according to the present invention, the payments required to use the AMM applications are authorised by the remote system SD.

The terminal TM hosts the payment proxy application PP belonging to the remote system SD and accessible to the paid-for applications by means of an A.P.I. (application programming interface) known as A.P.I.P. (or payment A.P.I.). This interface may be standardised.

More specifically, it is indicated that the AMM application send its payment orders to the payment proxy PP, when its operation so requires.

When the AMMC application is of the client/server type, in other words made up of the AMM presentation layer and the $AMM_2$ application layer described above, the payment orders may come from the application layer $AMM_2$ and be transferred to the payment proxy PP by the presentation layer AMM, as will be described later in the description.

As illustrated in FIG. 2a, it will be understood that the payment proxy PP has and implements two payment methods:
- local payment;
- remote payment.

The use of the local payment method by the payment proxy PP may be linked to various situations:
- the absence of the mobile telephony network signal, which requires contact with the remote system SD to be deferred;
- deliberate choice, due, for example, to the high implementation cost of a remote payment compared to the amount of the payment transaction executed, such as a unitary transaction, another choice such as remote payment being considered unreasonable;
- deliberate choice in order to reduce the implementation cost of a remote payment, it thus being possible for the payment proxy PP to be configured to aggregate successive transactions for the same remote system SD, the aggregated transactions then being seen by the remote system as a single transaction for example.

In all cases, the payment operation supposes the connection of the payment proxy PP with the remote system SD before or after the actual payment.

Finally, it will be recalled that the concept of a proxy relates to an application controlled by the remote system SD.

This concept covers that of a proxy payment server controlled by the remote system SD.

A more detailed description of step B for discriminating the local or remote character of the processing of the payment order will now be given in connection with FIG. 2b In general, step B consisting in discriminating the payment order is defined from a plurality of payment types executed by the payment proxy PP.

Figure 2B:
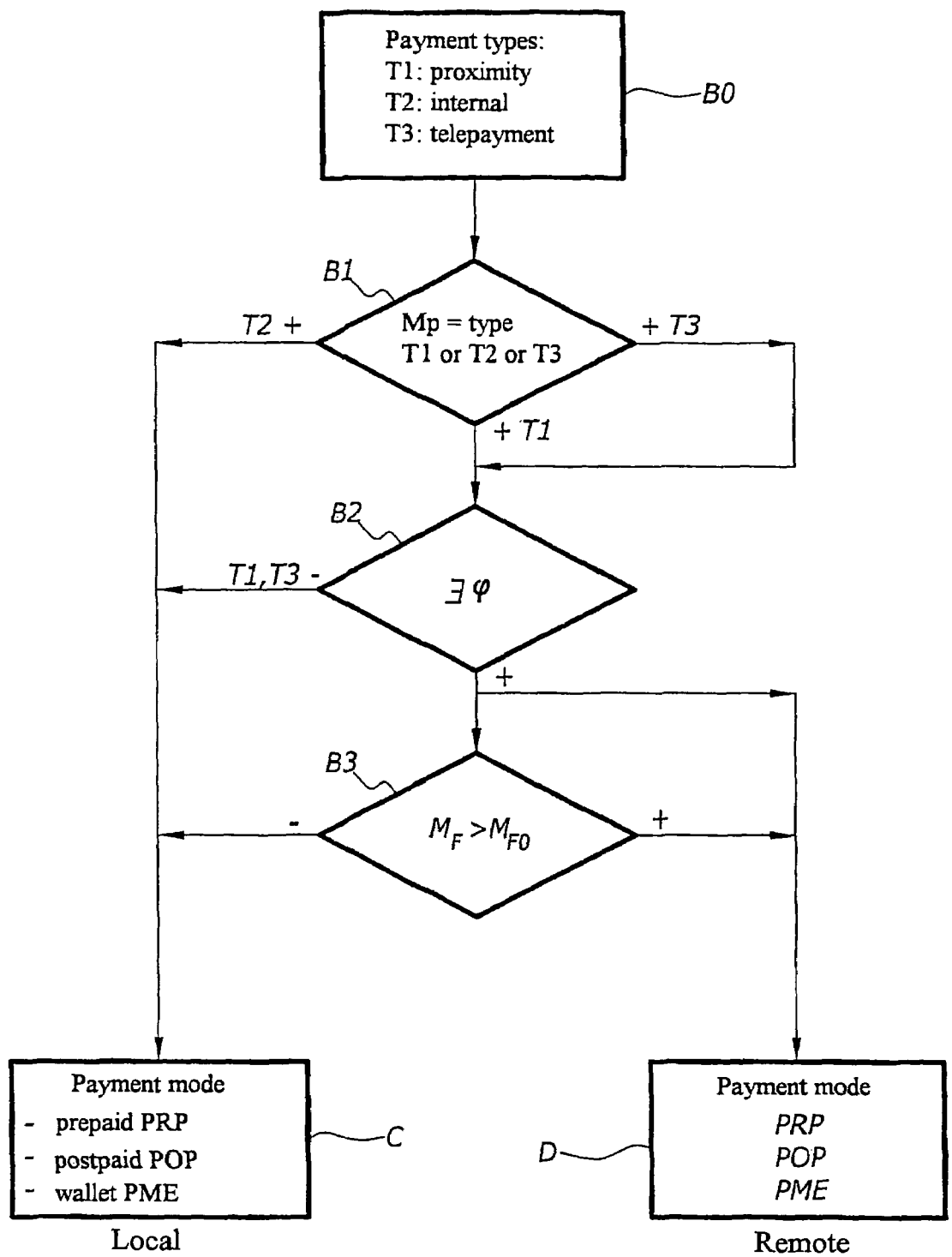

With reference to FIG. 2b, it is indicated that the payment proxy PP therefore has a plurality of payment types, such as for example, as illustrated in step $B_0$ of FIG. 2b:
- $T_1$: proximity payment. A proximity payment is a payment in which the multimedia terminal TM is connected to a payment terminal consisting for example of an electronic payment terminal TPE or a dedicated cash point or dispenser in a large store or elsewhere.
- $T_2$: internal payment. An internal payment is a payment in which the payment method, local payment, is used regardless of network availability.
  It therefore relates basically, but not limitatively, to a payment internal to the terminal TM;
- $T_3$: telepayment. A telepayment is a payment method in which remote payment is preferred. When the payment type is telepayment, the payment method used may nevertheless be local payment, if the network is not available.

With reference to FIG. 2b, an example of the implementation of the discrimination process of the payment order at the payment proxy on specific local or remote processing criteria thereof, in other words of step B of FIG. 2a, may comprise non-limitatively the following steps:
- step $B_1$: consisting in discriminating the payment type from the available payment types $T_1$, $T_2$, $T_3$, $M_P$ of type $T_1$ or $T_2$ or $T_3$.

If the response of test $B_1$ is positive, one of the aforementioned payment types being discriminated, this is an internal payment $T_2$, the processing method is therefore local at step C, as illustrated in FIG. 2b.

If the payment order $M_P$ is a proximity $T_1$ or telepayment $T_{3\ payment}$ type then step $B_2$ is called consisting in discriminating the presence or absence of the mobile telephony network cover phase $\phi$.

Step $B_2$ is illustrated as a test relating to the existence of phases according to the relation:

$$\exists \phi$$

If the response to test $B_2$ is negative, step C, payment execution by local processing, may be called. The local character of this processing may make a subsequent interaction $K_2$ with the remote system SD necessary, as mentioned later in the description.

If the response to test $B_2$ is positive a test $B_3$ may be called relating to the value of the transaction, in other words of the amount invoiced $M_F$, compared with a determined threshold value $M_{F0}$.

If the response to test $B_3$ is negative, execution of payment processing according to local processing C may then be called, whether the payment type is a proximity $T_1$ or telepayment $T_3$ payment type.

On the other hand, if the response to test $B_3$ is positive, execution of remote payment D may then be called for the proximity $T_1$ or telepayment $T_3$ payment types.

The implementation method of tests $B_1$, $B_2$ and $B_3$ is not limitative, and other combinations may be envisaged.

To facilitate implementation of electronic payment according to the present invention, specific payment means may be retained, these specific payment means defining in particular the payment execution method by the user of the multimedia terminal TM to obtain the service requested by means of the application AMM.

Thus, local or remote processing of payment orders is executed, according to a particularly advantageous aspect of the method according to the present invention, via a payment means.

This payment means uses a payment method chosen from the prepaid, virtual wallet, postpaid or electronic wallet payment methods for example.

The above list is not limitative, and other payment means combined with access control criteria for example may be envisaged.

In particular, when accessing video services, a payment means of the pay-per-view type, mentioned previously in the description, may be envisaged.

In general, it is indicated that a payment means is a means of making a payment, in other words a means causing a user-customer to pay.

Thus, a plurality of payment means is marked $MP_i$, and the payment means accessible to the user C of a multimedia terminal TM are marked $MP_{ic}$, for example.

The concept of invoicing therefore covers the use of a payment means following an action of which the object is to cause payment to be made.

Thus, a payment means $MP_k$ is a prepayment means, when the $MP_k$ operator causes the user to be paid the sum required for payment of a purchase using $MP_k$ before implementation of $MP_k$.

In the opposite case, the payment means $MP_k$ is said to be a postpayment means or $MP_k$ to be postpaid.

It will be noted that a payment means $MP_k$ may of course control payment transactions coming from various points of issue, in particular other than the multimedia terminal TM. A multimedia terminal TM therefore controls a sub-set of payment transactions controlled by a payment means $MP_k$. When TM is the only point of issue of $MP_k$, $MP_k$ is said to be dedicated to TM.

A more detailed description of an electronic payment system between a multimedia terminal TM and a remote payment management system SD according to the present invention will now be given in connection with FIG. 3 and FIG. 4.

Figure 3:
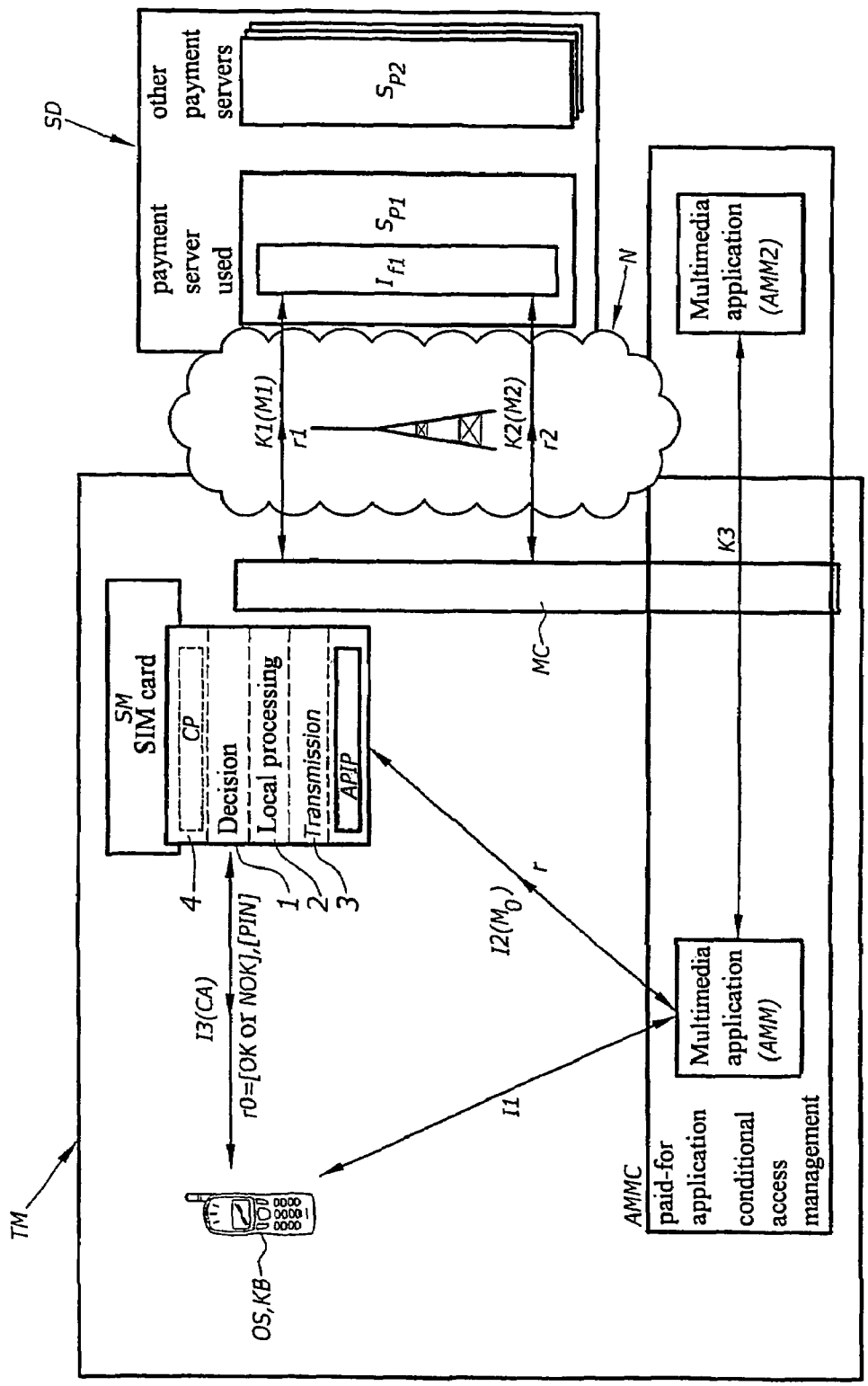
FIG. 3 represents, purely by way of illustration, a flow chart for an electronic payment system according to the present invention, more particularly intended for online payment.

With reference to FIG. 3, it is indicated that the remote system SD comprises at least a payment server, in particular, a payment server to use $SP_1$, interconnected to the mobile telephony network, for example, marked N by a communication interface marked $I_{fi}$. Other payment servers marked $SP_i$ may also be provided, it being possible for the various payment servers to be implemented, in particular, by multimedia terminal TM applications.

The multimedia terminal TM comprises at least a mobile radiotelephony communication interface, marked MC, which can be connected to the payment server via the network N.

As further illustrated in FIG. 3, it is indicated that the multimedia terminal TM comprises at least a payment proxy PP which receives messages or orders from a multimedia application, hosted on the multimedia terminal TM.

Regarding the multimedia terminal TM, it is indicated that this of course comprises the portions of a mobile telephony device such as the display device, keyboard KB and operating system OS, and of course the applications installed in the permanent memory thereof.

The complete multimedia application AMMC is said, in the example in FIG. 3, to consist of the paid-for application and, in particular, of a portion AMM installed on the multimedia terminal TM, the AMM containing in particular the AMMC presentation module and may consist of another portion $AMM_2$ located on a remote system SD connected to the AMM via a $K_3$ interaction, by means of the mobile radiotelephony communication interface MC and, of course, the network N.

With reference to FIG. 3, it is indicated that the payment proxy PP is disconnection-mounted between the AMM, in other words the portion local to the AMMC TM, and the communication interface MC, so as to intercept any payment order issued by the AMM, addressed to the remote system SD and, in particular, the payment server $SP_1$ said to control all the payment orders and possibly the access conditions of the service requested by the multimedia application AMMC.

As a non-limitative example, as illustrated in FIG. 3, the user of the multimedia terminal TM is supposed to generate, from the keyboard KB for example, and of course from the operating system OS of this terminal, an interaction $I_1$ with the local portion AMM of the multimedia application, which sends a payment order $M_0$ to the payment proxy during an interaction $I_2$ in order to allow access to the service requested in the course of the interaction $I_1$.

Due to the existence of the payment proxy PP and the characteristics thereof, the payment order $M_0$ normally addressed to the communication interface MC for transmission to SD is intercepted by the payment proxy PP, as illustrated in FIG. 3.

On receipt of the payment order $M_0$, the processing method in local or remote processing mode is then implemented by the payment proxy PP, as mentioned previously in the description.

Accordingly, the payment proxy PP comprises advantageously, as illustrated in FIG. 3, a module 1 for discriminating this payment order on a specific local or remote processing criterion of this payment order, a module 2 for the local processing of this payment order on specific local processing criteria retained for this payment order, as described previously in the description, in connection with FIGS. 2a and 2b, and a module 3 for transmitting the payment order $M_0$ to the payment server for carrying out a payment according to a remote payment method, where the specific local processing criterion has not been retained for the payment order $M_0$ in question.

Transmission of the payment order $M_0$ to the payment server, in particular to the payment server $SP_1$, is of course produced by means of the mobile radiotelephony communication interface MC of the multimedia terminal TM.

FIG. 3 illustrates the interaction $I_2(M_0)$ and its response r, the response from the payment proxy PP to the multimedia application AMM according to the conventions mentioned previously.

However, between receipt of the payment order $M_0$ and the aforementioned response r, the payment proxy PP may contact the user of the multimedia terminal TM in the course of an interaction $I_3(CA)$ to obtain his approval or simply to notify him of the payment made. The aforementioned interaction $I_3(CA)$ contains a command or display order CA sent to the mobile telephony terminal, in particular to the OS and display portions of the multimedia terminal TM.

The aforementioned order allows a confirmation request to be displayed to the user.

The object of the display order CA is to obtain the approval of the user, in other words it is not simply a notification, and accordingly the display command message CA contains the elements of the transaction allowing the holder-user of the multimedia terminal TM to make a decision with knowledge of the situation.

If the response of the user is positive, a response $r_0$ may be sent, the positive response being marked OK shown in square brackets in FIG. 3.

The response message $r_0$ advantageously comprises personal identification data marked [PIN].

If the response is positive OK, processing of the payment order continues according to the local or remote processing method, as described previously in the description.

If the response of the user is negative, NOK, the multimedia application AMM is then immediately informed by the payment proxy PP, by means of the response r to the interaction $I_2(M_0)$.

Processing of the payment order $M_0$ does not then continue.

In a preferred embodiment, the display order or command CA may contain a request for authentication of the user of the multimedia terminal TM as will be described below in the description.

In particular, when the multimedia terminal TM consists of a mobile telephony terminal, for example GSM, provided with a SIM card, the payment proxy PP is then, in a particularly advantageous manner, hosted at least partially on the SIM card. This embodiment is not reserved to GSM mobile telephony terminals.

In particular, when the multimedia terminal TM comprises a multimedia terminal security module SM, this module is of course used in order to ensure the integrity of the payment proxy PP.

In particular, when the mobile telephony terminal is a GSM terminal, this security module SM is formed by the SIM (or subscriber identification module) card thereof.

Preferably, the payment proxy PP consists advantageously of an application, in other words an application program that can be downloaded directly to the multimedia terminal TM.

It will be understood in particular that the aforementioned downloadable program or application then allows the function of representative server previously mentioned in the description to be performed in local or remote processing discrimination conditions as previously described in the description, in connection with FIGS. 2a and 2b.

The integrity of the downloaded code can then be controlled by the security module SM, in particular the SIM card, which both have the necessary cryptographic elements or resources.

For example, the application code downloaded to perform the function of payment proxy PP may be signed, this signature being checked by the security module SM, and, in particular, the SIM card previously mentioned, which holds the public key of the entity that signed the code of the aforementioned application.

The integrity of the public key is also protected by the multimedia terminal TM and in particular by hosting the aforementioned public key in the security module SM.

In general, it is indicated that the security modules may be removable.

This is the case in particular for mobile telephony terminals in the GSM network, which use a SIM card comprising a chip or security module, the unit being referred to as a SIM card.

When changing the SIM card, the original card may be placed in another multimedia terminal.

When a security module SM is used and it is removable, and if the payment proxy PP is hosted completely in the security module SM, the change of terminal does not in this case pose a problem.

The security module SM may then simply be inserted into a new compatible terminal for the system according to the invention to be able to function correctly.

If a security module SM is used and it is also removable and if the payment proxy PP is hosted completely or partly somewhere other than in the security module, the portion of the payment proxy PP that is not hosted in the security module SM may be loaded therein if the security module has enough free memory, before removal of the security module SM.

If not, a strongbox program may advantageously be used to protect the payment proxy PP or the portion thereof that is not hosted in the security module SM, before it is moved into the new multimedia terminal.

It will be recalled that a strongbox program is defined as a means of encrypting and decrypting data which can be implemented using a password, the same password being used to encrypt and decrypt the data to be protected.

Symmetric single key encryption/decryption may be used for example.

The strongbox program may be loaded into the security module SM, if the security module has enough free memory. If not, it may also be "downloaded" to a server provided for this purpose, while waiting to be downloaded into the new terminal.

Such an operational method for implementing the system according to the invention presupposes the putting in place of the necessary infrastructure of cryptographic keys and algorithms.

It is specified that the concept of uploading is used to refer to the transfer of data to the server.

A variant embodiment of the electronic payment system according to the present invention will now be described in connection with FIG. 4.

With reference to the aforementioned figure, the multimedia terminal TM further comprises a short-range interface, marked ICP, allowing execution of an application by means of an external electronic payment terminal, marked TP, in the same figure.

This allows proximity-type payments to be handled via the payment proxy PP, as will be described below.

It will be understood in particular that the short-range interface ICP may be present in the mobile telephony terminal hosting the corresponding AMM application.

In this situation, the user of the multimedia terminal TM is said to be in a proximity situation.

For example, the user is inside a conventional shop and has his multimedia terminal TM.

The aforementioned conventional shop has a payment terminal, such as an electronic payment terminal TP, for example, provided with a standardised interface using short-range electromagnetic waves.

This short-range interface ICP may consist of an infrared (IRDA), RFID ($RFID_{14443}$), Bluetooth or Wifi interface for example.

The user of the multimedia terminal TM in a proximity situation may also be in front of a cash point, for example a cash point or dispenser also provided with a short-range interface.

The multimedia terminal TM is assumed to have the necessary means for dialogue with the electronic payment terminal TP.

All these means combined under the term short-range interface ICP also contain the necessary resources to route messages to their destination, in particular when there is a plurality of possible destinations.

Figure 4:
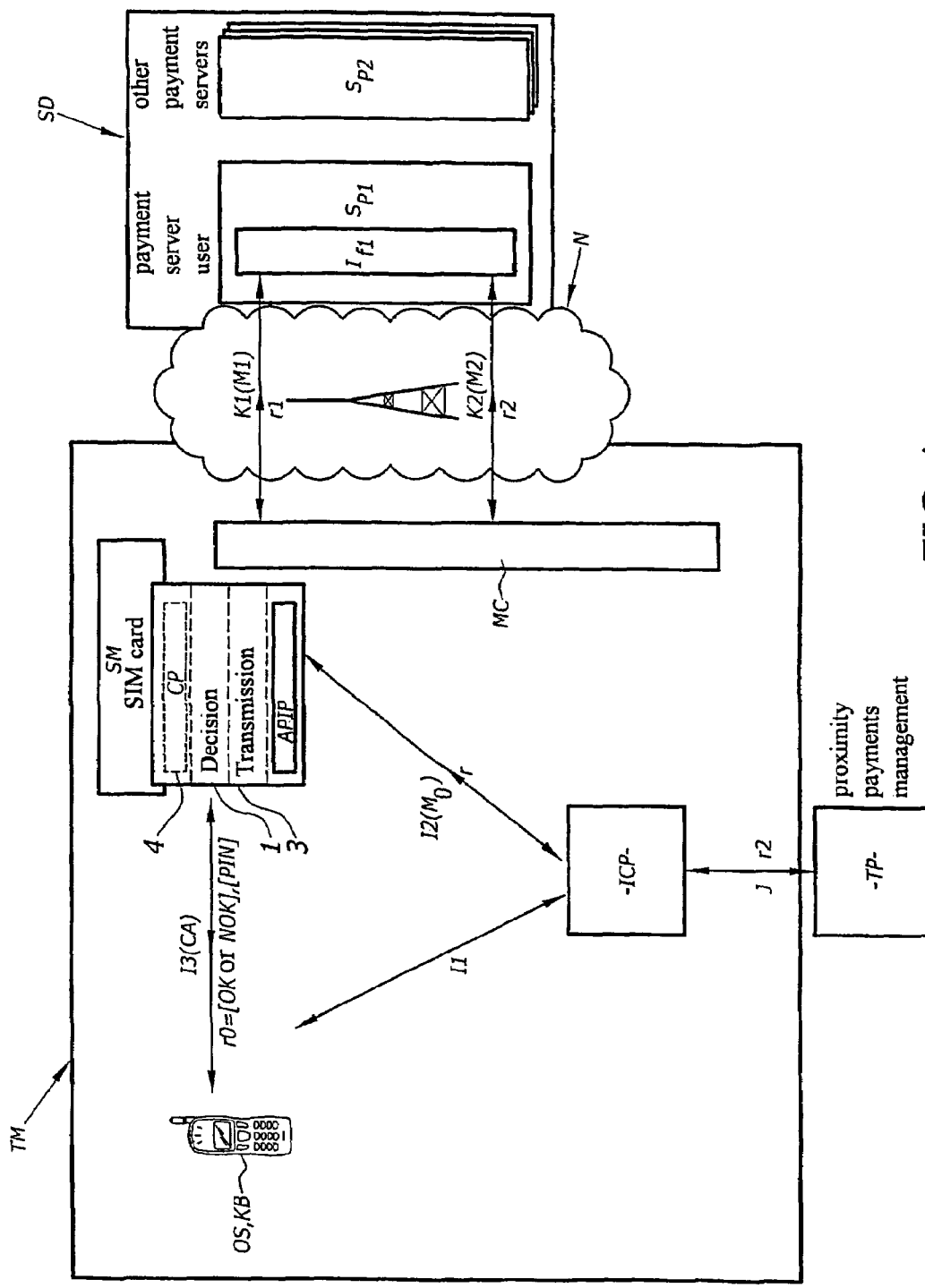
FIG. 4 represents, purely by way of illustration, a flow chart for an electronic payment system according to the present invention, more particularly intended, although not exclusively, for proximity payment.

This is the case for example if the optional interaction $I_1$, illustrated in FIG. 4, is provided and it comprises at least one dispatch of messages from the short-range interface ICP to the operating system OS of the mobile telephony terminal.

The interaction $I_1$ allows dialogue with the operating system, basically the multimedia terminal apart from the functions specific to the invention, that is to say, independent of the payment proxy PP.

The aforementioned interaction is optional since the messages that it conveys can also if necessary transit via the payment proxy PP, for example in the course of the interactions $I_2$ and $I_3$ illustrated in FIG. 4 or in the course of interactions not illustrated.

When such a dialogue transits via the payment proxy PP, the payment proxy PP is then able to control the dialogue between the electronic payment terminal TP and the user.

After having notified his intention to make a payment, the user of the multimedia terminal TM, in the situation in FIG. 4, in other words when using a short-range interface ICP provided with his multimedia terminal TM, is asked to come close enough to the payment terminal TP for the aforementioned short-range system to function.

In the case of proximity commerce with an electronic payment terminal, the cashier of the shop makes the necessary keystrokes on the electronic payment terminal TP, the effect of these keystrokes being to activate the interaction J initiated by the payment terminal TP.

In the case of a cash point, it is the keystrokes of the user himself on the multimedia terminal TM that activate this interaction.

By means of the interaction $I_1$, the customer is asked to authorise the use of his multimedia terminal TM for a proximity-type payment and thus to authorise dialogue between his mobile terminal TM and the payment terminal TP.

When this authorisation is given, the interaction $I_2$, already described in the context of the first embodiment illustrated in FIG. 3, allows the electronic payment terminal TP to send a payment order $M_O$ to the payment proxy PP, while respecting the format imposed by its APIP interface.

The payment proxy PP, as described above, initiates the interaction $I_3$ with the mobile telephony terminal and, in particular, the operating system OS thereof to obtain the approval of the user.

The user may then be asked to input an identification code, a personal PIN code, to authenticate himself.

The payment proxy PP interprets the response $r_0$ and if it deduces from this that the user has been correctly authenticated and that his approval, if this is required, has effectively been given, processes the payment order received in $I_2$, as previously described in the description.

The response $r_2$ of the short-range interface ICP to the payment terminal TP contains the required elements of the response r.

As described in the preceding proximity scenario, some of the elements of the response r may be signed by the payment proxy PP and/or the remote system SD. The signature or signatures produced may be transmitted by means of the response $r_2$ to the electronic payment terminal TP to serve as proof of payment.

Various items of information will be given below relating to the implementation of certain functionalities in the context of the first and second embodiments illustrated in FIGS. 3 and 4 of the electronic payment system according to the present invention.

In general, the electronic payment system according to the present invention has a high level of security.

Accordingly, the payment proxy PP is advantageously read/write access-protected by an access control and data encryption/decryption module by password, module 4 described previously in the description.

In particular, the multimedia terminal TM comprises a security module containing cryptographic resources that allow the signature of the payment proxy PP to be verified, when it is downloaded in the form of an application into the multimedia terminal.

Furthermore, the security of exchanges is assured particularly strictly in the conditions below.

With reference to FIGS. 3 and 4, it is indicated that the response r to the payment order 12 ($M_0$) or certain elements of this response may be signed using a private key (CP) protected by the mobile telephony terminal and, of course, by the payment proxy PP.

The private key CP is illustrated as being accessible by the payment proxy PP in FIGS. 3 and 4.

A private key CP is a key for which a certificate of the associated public key has been published.

Among the elements of the response r may figure in particular the data signed by the remote system SD coming from the response $r_1$ to the transaction $K_1(M_1)$, illustrated in FIGS. 3 and 4.

The aforementioned signatures allow the multimedia application AMMC to retain a proof of payment, which may be used in case of dispute, when a credit to the account of the operator of the AMMC application is not recognised.

The aforementioned proof may for example be transmitted to the remote $AMM_2$, illustrated in FIG. 3, or if necessary it may be filed normally on another server.

As illustrated in FIGS. 3 and 4, the aforementioned private key CP may have been defined under a pre-existing PKI system and may advantageously be hosted in the SIM card of the mobile telephony terminal forming the multimedia terminal TM.

The SIM card may be replaced by the WIM (wireless identification module) of the mobile telephony terminal or by the UICC (universal integrated circuit card).

Various payment scenarios implemented jointly by the first embodiment illustrated in FIG. 3 and the second embodiment illustrated in FIG. 4 of the electronic payment system according to the present invention, and if applicable scenarios specific to each, will now be given below.

In general, it is indicated that a payment means $MP_k$ is associated with a payment server $SP_k$, provided with an interface $I_{fk}$, allowing the server to receive payment messages to which it does or does not give a response in real time.

These messages are exchanged in the course of interactions marked $K_j$.

For example, a payment message for a payment means $MP_0$ may be an authorisation request if the interface $I_{f0}$ of $MP_0$ allows it.

The response to this payment message may be positive or negative.

In the case where an authorisation request message is sent, the interface $I_{f0}$ must provide for the management of a payment confirmation which is another type of payment message.

Such a payment confirmation is only sent following an authorisation request to which the response was positive. The customer is effectively only invoiced by the payment means $M_{P0}$ if the payment communication has been received.

The response to a payment confirmation may be simply a receipt indicating that the payment server $SP_0$ has taken account of the message in question.

A payment confirmation may be marked as sent or captured, in particular if it is significantly deferred in relation to the time the requesting customer made the payment.

A payment message may also be a debit request also followed by a positive or negative response.

A positive response to this payment message in this case indicates that the requesting customer has been or will be invoiced.

When the sub-set of transactions handled by the multimedia terminal TM for a payment means $MP_k$ in fact comprises all the transactions handled by the payment means in question $MP_k$, all the payments made using the payment means $MP_k$ are within the processing field of the payment proxy PP.

The payment means in question $MP_k$ is then said to be dedicated to the payment proxy PP and therefore ultimately to the multimedia terminal.

Such a recovery situation facilitates payment management by the payment proxy PP, as will be explained below.

The description below describes a scenario for the payment types, internal payment $T_2$ or telepayment $T_3$, described previously in the description.

Payment Initialisation.

When the user initiates a paid-for action in the course of using the AMMC application, the application detects the need for a payment and the local portion AMM of the multimedia application AMMC transmits a payment order $M_0$ via the interaction $I_2$ previously described in connection with FIGS. 3 and 4 to the payment proxy PP by means of the API, APIP.

This payment order $M_0$ is taken over by the payment proxy PP.

Protection of the Payment Proxy PP and Security of the Payment Application.

Because the payment proxy PP is a protected local application, as previously described in the description, held by the remote system SD, although hosted in the multimedia terminal TM, its behaviour cannot be modified by the holder-user of the multimedia terminal TM.

Local Processing of the Payment Order, in the Case of Internal Payment:

If the payment type corresponds to type $T_2$, internal payment, the payment order $M_0$ is processed locally by the payment proxy PP, regardless of network availability, the branch joining the positive output of test $B_1$ of FIG. 2b for $T_2$ at step C of FIG. 2b.

The payment proxy PP processes this payment order using its local database and sends the response r to the local portion AMM of the multimedia application AMMC. The response r may be transmitted to the remote portion $AMM_2$, if there is one.

It is indicated in particular that local payment is advantageously carried out in a particular case, if the payment method is a local electronic wallet.

Local Processing of the Payment Order, in the Case of Telepayment:

In this case, as illustrated in FIG. 2b, the remote or local payment method depends basically on network availability, in other words on the test in step $B_2$ of FIG. 2b. It will be noted that the response of the payment proxy PP to the multimedia application AMMC may clearly vary according to whether or not connection to the remote system SD is possible, non-availability of the network phase forcing the payment proxy PP to use local criteria to make a decision on whether or not to authorise a payment order.

a) If the network is available:

If the payment type is $T_3$ telepayment and if the network is available in accordance with test $B_2$ of FIG. 2b, the remote payment method is used by calling step D in FIG. 2b.

Following receipt of the payment order $M_0$, a payment order $M_1$ is transmitted, by means of an interaction $K_1$, to the remote system SD, as illustrated in FIGS. 3 and 4.

It will further be noted that, in the case of telepayment, the first payment message sent to the remote system SD may be an authorisation request.

In the context of the implementation of the system according to the present invention, this authorisation request follows a payment order:

If $M_1$ is an authorisation request, a deferred transaction $K_2$ may be implemented to confirm the transaction.

Because the remote system SD was available and accessible, the remote system sends the response $r_1$ to the payment proxy PP, which may process this response, in particular using its local database then send its own response r to the local portion AMM of the multimedia application AMMC.

This response comprises in particular the elements of the response $r_1$ required by the AMMC application.

The aforementioned required elements may then be transmitted to the remote portion $AMM_2$ of the multimedia application, if there is one.

b) If the network is not available:

In the case of a $T_3$ telepayment payment type and if the network is not available, in other words on receiving a negative response to test $B_2$ of FIG. 2b, the local payment method in step C in the aforementioned same figure is used. The payment order $M_0$ is then processed locally by the payment proxy PP.

Since the remote system SD was not available, the payment proxy PP processes the payment order locally using data available in its local database.

The absence of cooperation of the remote system SD may for example lead to the use of stricter criteria for sending a positive response to the payment order.

In all cases, it will be recalled that the positive or negative response r of the payment proxy PP to the payment order $M_0$, may be signed.

Finally, it is indicated that where the multimedia terminal consists of a GSM-network mobile telephony terminal, network availability may be known from the SIM card if it interrogates MC, which may then communicate this information directly to the payment proxy PP.

In this situation, the hosting of the payment proxy PP in the security module and, in particular, in the SIM card, appears particularly advantageous.

Deferred Processing Description of the Interaction $K_2$ Illustrated in FIGS. 3 and 4.

When the payment processing method is local payment, in other words when the payment order $M_0$ has been processed locally, either in the case of internal payment or telepayment with the network unavailable, a deferred interaction $K_2$ may be used to send the elements of the transaction to the remote system SD, as previously indicated in the case of telepayment.

Activation of the deferred interaction $K_2$ may be linked to an independent external event for example when there is another payment for the customer or following an explicit request from the remote portion $AMM_2$ of the multimedia application AMMC or linked to a date-type event for example.

Thus, the interaction $K_2$ may be activated by the payment proxy PP, for example after expiry of a particular determined date.

Expiry of the aforementioned period may be controlled by the payment proxy PP, for example by regularly reading the date received from the network.

The elements of a plurality of transactions may be sent during the same interaction $K_2$ in a grouped remittance.

The aforementioned transaction $K_2$ may contain the sum of the transaction amounts that it transports. When this sum is present in the transaction $K_2$ the amounts of the individual transactions may not be transmitted. A transaction aggregate is then said to be transmitted.

Local Processing of the Payment Order.

The response r from the payment proxy PP to the multimedia application AMMC is given from a database saved locally.

The following description gives examples of data saved locally for or by the payment proxy PP and of the processing associated with this data.

In the following description, when a variable has an index k, the variable used corresponds to the management of the payment means $MP_k$.

History of Payment Orders and Responses Given

The payment proxy PP is able to manage the payment order history $OP_{kj}$ for each payment means $MP_k$ where j is a transaction reference number for example.

The payment proxy PP may also manage the history of the responses $r_j$ already given locally and remotely by the remote system SD, where j is the transaction number.

These histories may be used to form remittance payment messages with connection to the remote system SD.

Payment Means Profile

The payment proxy PP can manage the payment means profile $MP_k$, namely the fact that the payment means uses a prepaid, postpaid or electronic wallet payment method for example.

Local Electronic Wallet:

The payment proxy PP may for example manage a local electronic wallet, marked $PMVL_k$, made up of a set of variables comprising at least the balance of the wallet $S_k$. Such an electronic wallet uses exclusively the payment type "internal payment" for example. The authorities operating the payment proxy PP and the payment means $MP_k$ must then offer the customer a means of reloading the balance $S_k$. The reloading of the payment means $MP_k$ may use another payment means $MP_j$ with $j \neq k$ or finally any other payment means.

In general it is indicated that the payment proxy PP may manage a local fixed amount marked $FF_k$ made up of a set of variables comprising at least the balance of the fixed amount $S_k$. The payment means $MP_k$ is therefore a local fixed amount using exclusively the "internal payment" payment type. The customer-owner of the multimedia terminal in fact buys a local fixed amount $MP_k$ of amount S and has this sum available for a determined period of time P known as the "period". At the end of the period, the remaining amount becomes unusable. The aforementioned operators in the case of the electronic wallet then allow the user-owner of the aforementioned local fixed amount to have a means of buying this local fixed amount so as to put in place a means of initialising the balance $S_k$ at the value S.

The payment proxy PP may also manage a recurring local fixed amount marked $FLR_k$ made up of a set of variables comprising at least the balance of the fixed amount $S_k$. In this situation, the payment means $MP_k$ is a recurring fixed amount using exclusively the "internal payment" payment type. When the customer-user subscribes at a local fixed amount $MP_k$ he then has the sum S available for a determined time interval P known as the "period". At the end of the period the balance $S_k$ is reinitialised to the value S regardless of the previous value. The sum S again becomes available for the next period, generally of the same duration as the previous one, and so on. The operators of the recurring local fixed amount must offer the customer-user a means of subscribing and unsubscribing to and from the recurring local fixed amount and a means of periodically reinitialising the balance, and thus of making the required subscription payment.

Finally, the payment proxy PP may allow management of a local balance marked $SL_k$, for example when the payment means $MP_k$ used is a virtual wallet, and a total amount of expenditure made locally $MTDL_k$. The variables $SL_k$ and $MTDL_k$ must constantly verify the relation $MTDL_k < SL_k$. During connection to the remote system SD, these two variables are updated: $MTDL_k$ is reset to zero and $SL_k$ takes a new value, which takes account, in particular, of the payments made with $MP_k$ but without TM, if $MP_k$ is not dedicated to TM.

It is indicated by way of non-limiting example that the payment proxy PP may also manage the total amount spent $MTD_k$ and the expenditure ceiling $PD_k$ over a given period in a manner known per se. The total amount spent $MTD_K$ should be understood as the sum of all the expenditure made over the current period with the payment means $MP_k$ which has been subject to a payment order via the payment proxy PP.

In particular, when the payment means is dedicated to the payment proxy PP, the aforementioned concepts of ceiling and amount of local expenditure are identical to the same concepts defined for the payment means $MP_k$ as a whole, since the payment proxy PP is able to process all the payments using $MP_k$.

The current period is defined as a period containing the moment when the value of $MTD_k$ "total amount spent" is taken into consideration.

If the payment means $MP_k$ is an internal payment means, the current period may then for example be the time interval between two remittance messages provided by the payment means $MP_k$.

If $MP_k$ is a telepayment means, the current period may also be the time interval between two payments with connection to the remote system SD allowed by network availability.

Regarding management of the expenditure ceiling $PD_k$ this ceiling may be regarded as valid for each period in question. Other management methods of electronic wallet entities may also be introduced, without departing from the scope of the present invention.

The invention claimed is:

1. An electronic payment method between a multimedia terminal and a remote payment management system, comprising:

transmitting from the multimedia terminal a payment order, issued by at least one multimedia application hosted by said multimedia terminal, to a payment proxy local to the multimedia terminal;

determining, in said local payment proxy, if said payment order is to be processed by a local payment or a remote payment;

processing the payment order, in said payment proxy, according to a local payment method upon determining that the payment order is to be processed by local payment; and transmitting the payment order to said remote system, to carry out a payment according to a remote payment method upon determination that the payment order is to be processed by remote payment, wherein said determining step determines that said payment order is to be processed a) according to a remote payment method if
  i) the payment type determined from the payment order is of a type of at least a proximity payment or a telepayment, and
  ii) a connection to a remote payment system is available via a network, or else b) according to the local payment method.

2. The electronic payment method according to claim 1, wherein the selection criterion for execution of the payment type is a function of the presence or the absence of a network cover.

3. The electronic payment method according to claim 1, wherein said local or remote processing method is executed by a payment means, said payment means using a payment process chosen at least from the prepaid, postpaid or electronic wallet payment processes.

4. A payment proxy adapted to be installed in a multimedia terminal programmed to receive a payment order issued by at least one multimedia application hosted by the multimedia terminal and to transmit said payment order to at least a mobile radiotelephony communication interface connected to payment servers, said payment proxy configured to intercept any payment order issued by said application, said payment proxy comprising:

means for determining if said payment order is to be processed by a local payment or by a remote payment;

means for locally processing the payment order, according to a local payment method upon determining that the payment order is to be processed by local payment; and means for transmitting said payment order to said payment servers, to carry out a payment according to a remote payment method, by means of said communication interface upon determining that said payment order is to be processed by remote payment, wherein the means for determining if said payment order is to be processed according to a local payment or a remote payment is configured to determine that said payment order is to be processed a) according to a remote payment method if
  i) the payment type determined from the payment order is of a type of at least a proximity payment or a telepayment, and
  ii) a connection to a remote payment system is available via a network, or else b) according to the local payment method.

5. The payment proxy according to claim 4, wherein said payment proxy is mounted between said application and said communication interface.

6. A multimedia terminal, comprising:
at least a mobile radiotelephony communication interface; and
a payment proxy,
said payment proxy comprising:
means for determining if said payment order is to be processed by a local payment or by a remote payment;
means for locally processing the payment order, according to a local payment method upon determining that the payment order is to be processed by local payment; and
means for transmitting said payment order to said payment servers, to carry out a payment according to a remote payment method, by means of said communication interface upon determining that said payment order is to be processed by remote payment,
wherein the means for determining if said payment order is to be processed according to a local payment or a remote payment is configured to determine that said payment order is to be processed
a) according to a remote payment method if
  i) the payment type determined from the payment order is of a type of at least a proximity payment or a telepayment, and
  ii) a connection to a remote payment system is available via a network,
or else
b) according to the local payment method.

7. The multimedia terminal according to claim 6, wherein that said terminal comprises a GSM mobile telephony terminal provided with a SIM card, said payment proxy being hosted on said SIM card.

8. The multimedia terminal according to claim 6, wherein said payment proxy comprises an application that can be directly downloaded onto said multimedia terminal.

9. The multimedia terminal according to claim 6, further comprising:
a security module, said module containing at least cryptographic resources allowing the signature of said payment proxy to be verified, when said payment proxy is downloaded in the form of an application in said multimedia terminal.

10. The multimedia terminal according to the claim 6, further comprising:
a short-range interface for receiving the payment order from an external electronic payment terminal.

11. The multimedia terminal according to claim 6, wherein said payment proxy is read-write access protected by an access control and data encryption/decryption module, said access control and data encryption/decryption module using password.

12. A computer readable storage medium encoded with microprocessor-executable instructions when executed by a microprocessor causes the microprocessor to perform the steps of:
determining if a payment order is to be processed by a local payment or a remote payment;
locally processing the payment order, according to a local payment method upon determining that the payment order is to be processed by local payment; and
transmitting the payment order to at least one payment server, to carry out a payment according to a remote payment method, by means of a communication interface upon determination that the payment order is to be processed by remote payment,
wherein said determining step determines that said payment order is to be processed
a) according to a remote payment method if
  i) the payment type determined from the payment order is of a type of at least a proximity payment or a telepayment, and
  ii) a connection to a remote payment system is available via a network,
or else
b) according to the local payment method.

* * * * *